US 6,614,626 B2

(12) United States Patent
Raphael et al.

(10) Patent No.: US 6,614,626 B2
(45) Date of Patent: Sep. 2, 2003

(54) SAW TOOTH ACTUATOR FOR A DISC DRIVE

(75) Inventors: William John Raphael, Bethany, OK (US); Carl Fred Adams, Yukon, OK (US); Nigel Frank Misso, Bethany, OK (US); Kenny Troy Coker, Mustang, OK (US); Eldon L Nelson, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/033,484

(22) Filed: Dec. 28, 2001

(65) Prior Publication Data
US 2002/0154449 A1 Oct. 24, 2002

Related U.S. Application Data
(60) Provisional application No. 60/258,789, filed on Dec. 29, 2000.

(51) Int. Cl.[7] .................................................. G11B 5/55
(52) U.S. Cl. ....................................................... 360/266
(58) Field of Search ........................... 360/265.7, 265.9, 360/266, 244.2, 244.9

(56) References Cited
U.S. PATENT DOCUMENTS

| 4,175,275 A | 11/1979 | Schaefer |
| 4,189,759 A | 2/1980 | Bauck et al. |
| 4,378,922 A | 4/1983 | Pierce |
| 5,130,871 A | 7/1992 | Whitmore |
| 5,378,524 A | 1/1995 | Blood |
| 5,677,815 A * | 10/1997 | Chan ........................ 360/265.7 |
| 5,854,725 A | 12/1998 | Lee |
| 5,999,372 A | 12/1999 | Peterson et al. |
| 6,366,432 B1 * | 4/2002 | Tadepalli et al. ........... 360/266 |
| 6,397,699 B1 * | 6/2002 | Ikemoto et al. .......... 74/490.01 |
| 6,473,271 B1 * | 10/2002 | Rahman et al. ............. 360/266 |

FOREIGN PATENT DOCUMENTS

| JP | 4-109468 | * | 4/1992 |
| JP | 5-174523 | * | 7/1993 |
| WO | 98/37559 | * | 8/1998 |

* cited by examiner

Primary Examiner—David L. Ometz
(74) Attorney, Agent, or Firm—Jennifer M. Buenzon

(57) ABSTRACT

An apparatus is described which reduces flow-induced disturbances of the head. A disc drive assembly is provided which includes a basedeck and top cover. A spindle motor mounted to the basedeck which rotates around a central axis; at least one magnetic storage disc mounted to the spindle motor for rotation around the central axis and an actuator arm assembly. The actuator arm assembly includes an actuator arm rotatably attached to a pivot axis and a suspension arm attached to a distal end of the actuator arm. A magnetic transducing head is attached to the suspension. The head is used to read and write data to the magnetic storage disc. Finally, a leading surface portion of the actuator arm utilizes several turbulence-reducing portions laterally recessed so as to guide an airflow to reduce a flow-induced disturbance acting on the transducing head.

19 Claims, 4 Drawing Sheets

SAW TOOTH ACTUATOR FOR A DISC DRIVE

CROSS-REFERENCE TO RELATED APPLICATION

This application claims the benefit of U.S. Provisional Application No. 60/258,789, filed Dec. 29, 2000.

FIELD OF THE INVENTION

This invention relates generally to disc drives and more particularly, but not by way of limitation, to disc drive actuators.

BACKGROUND OF THE INVENTION

Computers geared towards all sorts of uses commonly use hard disc drives to store large amounts of data in a form that can be readily accessed by a user. A hard disc drive generally includes a stack of vertically spaced magnetic discs that are rotated at a constant high speed by a spindle motor. The surface of each disc is divided into a series of concentric, radially spaced data tracks in which the data are stored in the form of magnetic flux transitions.

Data is stored and accessed on the discs by an array of read/write heads ("heads") mounted to a rotary actuator assembly or an "E-block." Typically, the E-Block includes a plurality of actuator arms that project outwardly from an actuator body to form a stack of vertically spaced actuator arms. The stacked discs and arms are configured so that the surfaces of the stacked discs are accessible to the heads mounted on the complementary stack of actuator arms.

Each of the heads is mounted to an actuator arm by a flexure that attaches to the end of the actuator arm. Each head includes an interactive element such as a magnetic transducer which either senses the magnetic transition on a selected data track to the read the data stored on the track, or transmits an electrical signal that induces magnetic transition on the selected data track to write data to the data track. Air currents are generated by the high-speed rotation of the planar surfaces of the discs. A slider assembly included on each head has an air bearing surface, which interacts with the air currents to cause the head to fly at a short distance above the data tracks on the disc surface.

As the disc drive industry has developed, the emphasis has been on increasing the amount of storage available in each individual drive. While there was a time where the mechanism used to accomplish this was to add more discs to the drive, recent developments have now turned to increasing the number of tracks per inch (TPI) on the disc itself as a method of increasing storage capacity of the drive.

Part of increasing the TPI of a drive is to provide a stable environment within the disc drive itself. Part of this stable environment includes minimizing the amount of turbulence created by the wind generated by the rotation of the discs in the drive. Any turbulence within the drive may generate vibrations in the actuator arm and unwanted movement of the supporting suspension and the head/gimbal assembly (HGA). The increased TPIs of discs today are less tolerant of any significant modulation of the head, as it increases the incidence of errors in both reading and writing data to the discs.

In the past, various methods have been utilized to reduce the amount of air turbulence in the drive. These methods have included the use of shrouds and air dams around the perimeter of the discs in a disc stack. Other methods have utilized modifications in the design of the actuator arm itself.

For example, in one such configuration, a wedge shape is provided on the leading surface of the actuator arm. This configuration functions to decrease the amount of turbulence in the drive. However, this alternative method creates a laminar airflow downstream of the arm that can create a small number of high amplitude excitations upon the HGA. These excitations are created when the laminar airflow generated by the spinning of the discs flows in one laminar layer over the actuator arm. This large flow interacts with other airflows in the drive, namely those under and around the actuator arm, thus creating large amplitude excitations of the head. While turbulence in the drive is reduced, the large amplitude excitations can dramatically affect the ability of the head to not only stay on track, but also to write data on track. Therefore, there is a need for an improved technique for reducing air turbulence within the disc drive.

SUMMARY OF THE INVENTION

The present invention relates to a disc drive actuator arm having a contoured leading surface portion for reducing flow-induced disturbance action on the head.

In accordance with one embodiment of the invention, a disc drive assembly includes a basedeck and top cover. A spindle motor mounted to the basedeck which rotates around a central axis; at least one magnetic storage disc mounted to the spindle motor for rotation around the central axis and an actuator arm assembly. The actuator arm assembly includes an actuator arm rotatably attached to a pivot axis and a suspension arm attached to a distal end of the actuator arm. A magnetic transducing head is attached to the suspension. The head is used to read and write data to the magnetic storage disc. Finally, leading surface portion of the actuator arm utilizes several turbulence-reducing portions laterally recessed so as to guide an airflow to reduce a flow-induced disturbance acting on the transducing head.

A further embodiment of the invention may include the use of rounded notches distributed across the leading surface portion of the actuator arm. Yet another embodiment utilizes saw-toothed triangular cutouts on the leading surface portion of the actuator arm to divide the laminar airflow interacting with the actuator arm.

The present invention can also be implemented as an actuator assembly in a disc drive having at least one rotatable disc, the actuator assembly includes an actuator arm rotatably attached to a pivot axis and a suspension arm attached to a distal end of the actuator arm. A magnetic transducing head is attached to a distal end of the suspension and is used to read and write data to the disc. A leading surface portion of the actuator arm has several turbulence-reducing portions laterally recessed so as to guide an airflow to reduce flow-induced disturbance action on the transducing head.

These and various other features as well as advantages that characterize the present invention will be apparent upon reading of the following detailed description and review of the associated drawings.

DETAILED DESCRIPTION

Figure 1:
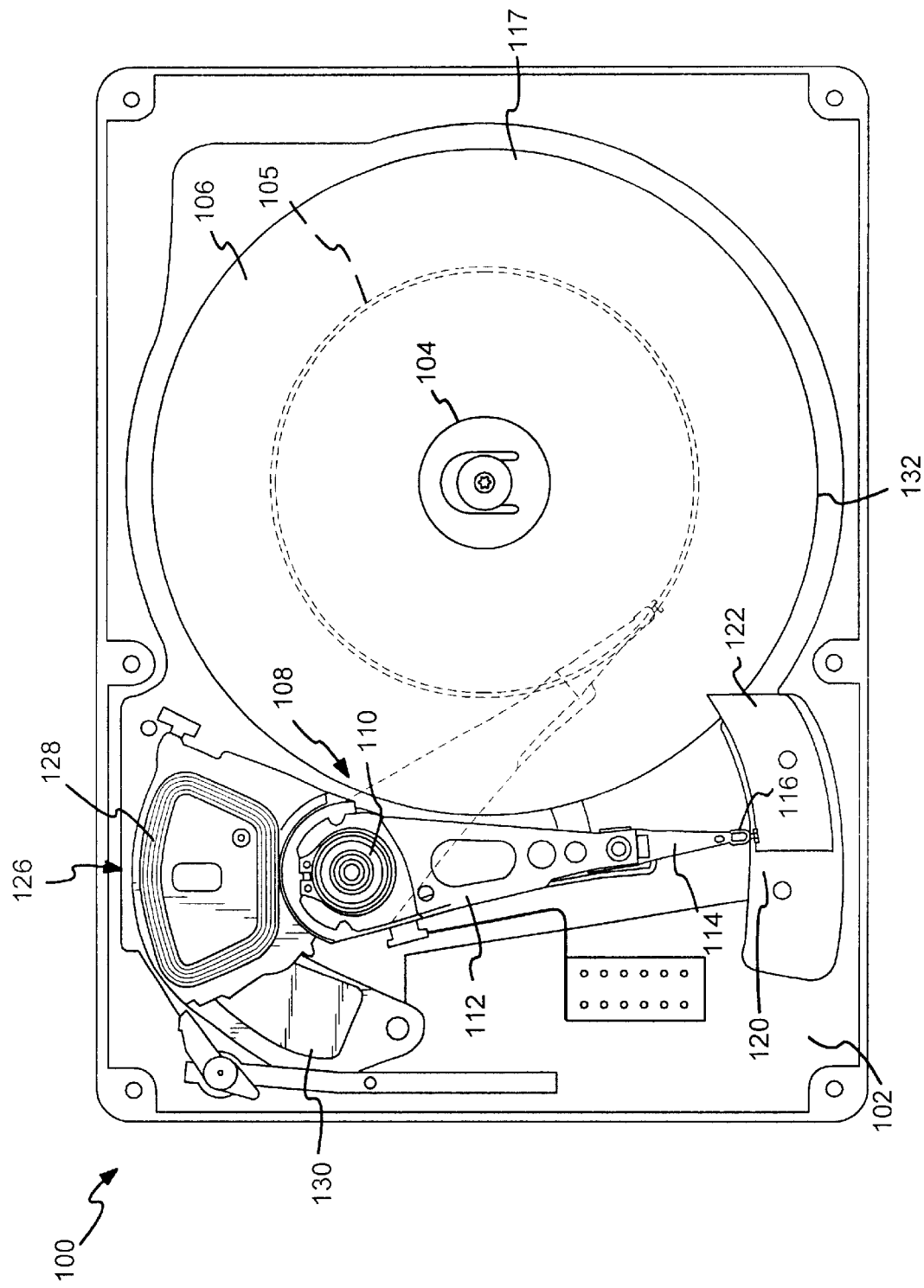
FIG. 1 is a top plan view of a disc drive constructed in accordance with a preferred embodiment of the present invention.

A disc drive assembly 100 constructed in accordance with a preferred embodiment of the present invention is shown in FIG. 1. The disc drive 100 includes a base 102 to which various components of the disc drive 100 are mounted. A top cover (not shown) cooperates with the base 102 to form an internal, sealed environment for the disc drive in a conventional manner. The components include a spindle motor 104, which rotates one or more information storage discs 106 at a constant high speed. Information is written to and read from tracks 105 on the discs 106 through the use of an actuator assembly 108, which rotates during a seek operation about a bearing shaft assembly 110 positioned adjacent the discs 106. The actuator assembly 108 includes a plurality of actuator arms 112 which extend towards the discs 106, with one or more flexures 114 extending from each of the actuator arms 112. Mounted at the distal end of each of the flexures 114 is a transducer 116 that is embedded in an air bearing slider (not shown) enabling the transducer 116 to fly in close proximity above the corresponding surface 117 of the associated disc 106.

During a seek operation, the track position of the transducer 116 is controlled through the use of a voice coil motor (VCM) 126. The VCM typically includes a coil 128 attached to the actuator assembly 108, as well as one or more permanent magnets 130 which establish a magnetic field in which the coil 128 is immersed. The controlled application of current to the coil 128 causes magnetic interaction between the permanent magnets 130 and the coil 128 so that the coil 128 moves in accordance with the well-known Lorentz relationship. As the coil 128 moves, the actuator assembly 108 pivots about the bearing shaft assembly 110, and the transducers 116 are caused to move across the surfaces of the discs 106.

The spindle motor 104 rotates the one or more information storage discs 106 at a constant high speed, for example 15,000 revolutions per minute (RPM). The rotation of the discs 106 creates a flow of air over and between the discs, commonly referred to as windage. This airflow travels over a surface of the disc in a laminar flow until it interfaces with the actuator arm 112. With a non-contoured, streamlined actuator arm, the airflow continues on in a laminar flow up and over the actuator arm 112, thus creating small, yet high amplitude excitations to the entire head gimbal assembly (HGA). The excitations are created by the convergence of multiple airflows around and over the actuator arm. These excitations serve to contribute to the motion of the head that may result in the head moving off of the track.

Figure 2:
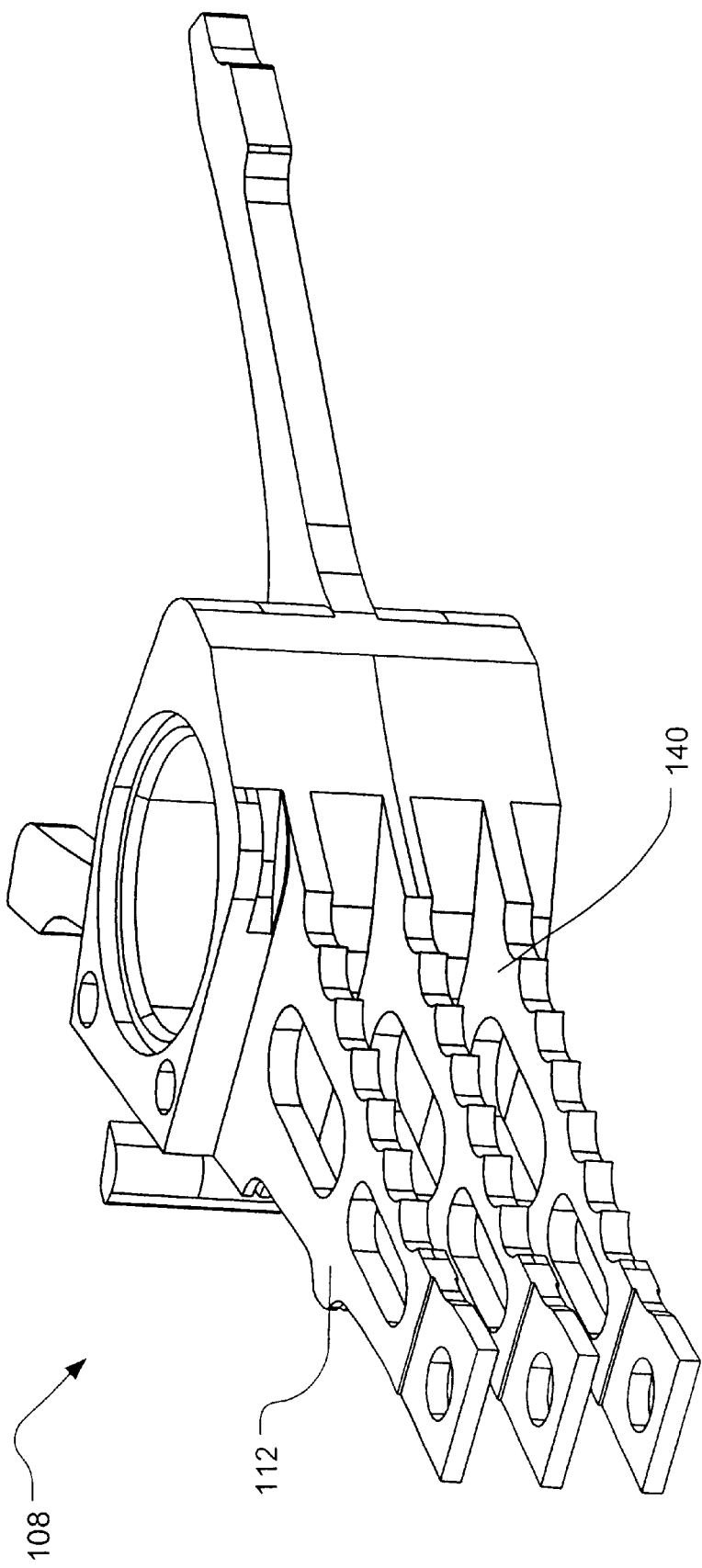
FIG. 2 is a plan view of the actuator assembly showing a preferred embodiment of the present invention utilizing multiple arms.

In a preferred embodiment of the invention, this problem is addressed by breaking up the laminar airflow into two or more separate airflows by utilizing a contoured leading surface 140 on the actuator arm 112. As shown in FIG. 2, the contoured leading surface 140 may be utilized on multiple actuator arms 112 within the same actuator assembly 108.

Figure 3:
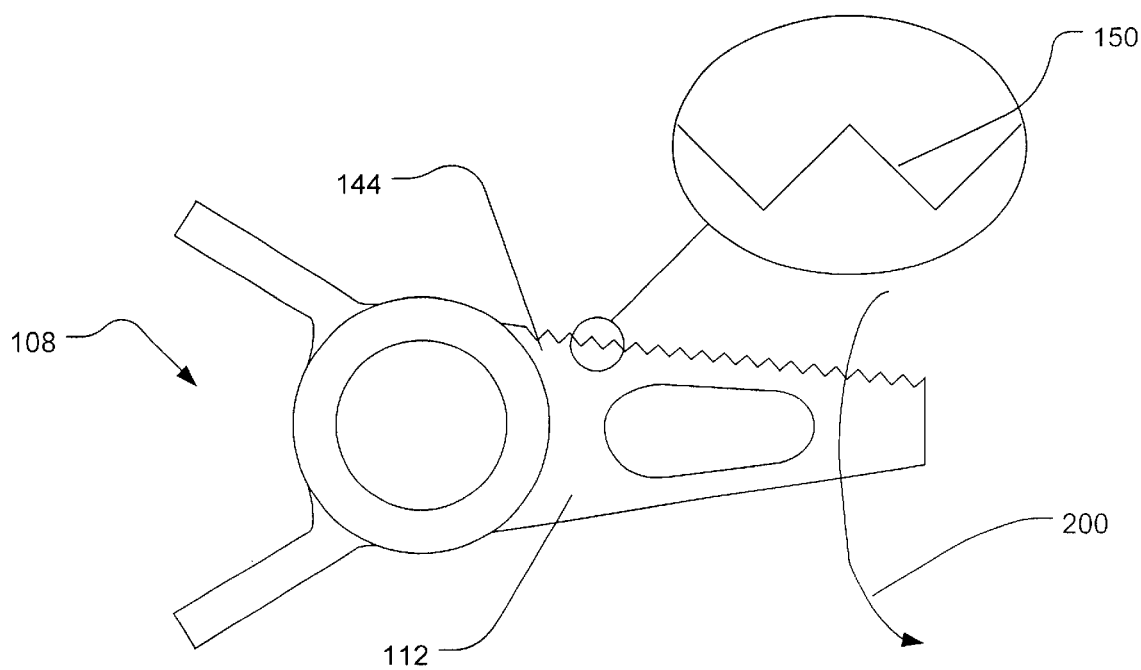
FIG. 3 is a perspective view of an actuator assembly with the heads and flexures removed constructed in accordance with a preferred embodiment of the present invention.

One embodiment may be found in FIG. 3. In this embodiment, instead of a curved notch, several equally sized triangular cutouts 150 are placed on the leading surface 142 of actuator arm 112. This shape also serves to break up the laminar airflow 200 as it hits actuator arm 112. The same effect is gained as by the use of curved notches 140. The laminar airflow 200 is divided into several smaller airflows that proceed over actuator arm 112 and into the region immediately downstream of the actuator assembly 108. The smaller airflows created by the dissection of the original laminar airflow 200 are then combined with the other airflows present downstream of the actuator arm 112. The combination of these flows still produce some excitations, but they are mainly of a low amplitude with a greatly reduced effect on the motion of the transducer 116 and the air-bearing slider.

Figure 4:
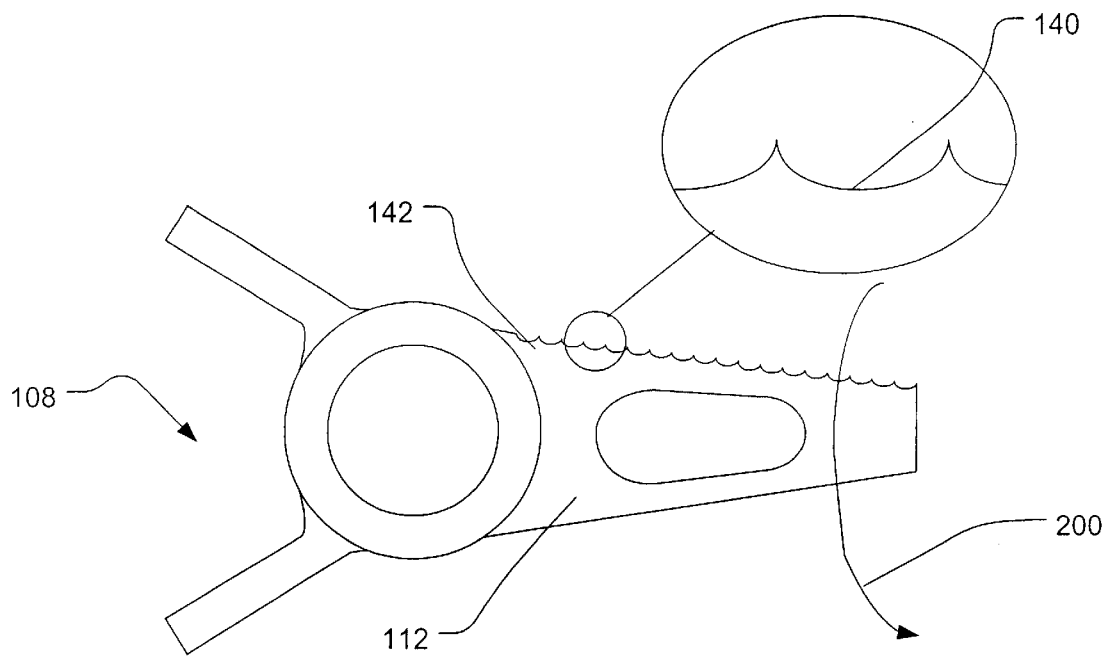
FIG. 4 is a perspective view of an actuator assembly with the heads and flexures removed constructed in accordance with a preferred embodiment of the present invention.

As shown in FIG. 4, one embodiment of the invention utilizes several equally sized rounded notches 140 on the leading surface 142 of the actuator arm 112. As the airflow 200 makes contact with the actuator arm 112, the rounded notches 140 break up the laminar airflow 200 hitting the actuator arm 112. These smaller individual airflows then flow over the actuator arm 112 and proceed downstream to interact with the other airflows present in the drive. Although the smaller airflows still create excitations of the HGA, the excitations are at lower amplitudes thus reducing the amount of motion translated to the head.

The spacing and respective size of the curved notches 140 and/or the triangular cutouts 150 are adaptable to the design requirements of individual use situations. Some possible configurations would include placing the cutouts along various portions of the actuator arm 112, from the entire length to only certain portions. The choice not only of placement by also of the size and spacing of the contours on the leading surface 142 of the actuator arm 112 may be influenced by various factors present within the drive itself. One skilled in the art will recognize that such choices are design-driven and are encompassed by the present invention.

While only the curved notch 140 and the triangular cutout 150 are described herein, it should be appreciated that any shape that divides the laminar airflow interacting with the actuator arm 112 are also contemplated by the disclosure. Examples of such shapes include semi-spherical bumps or recessed dimples placed on the leading surface portion 142.

The leading surface 142 of the actuator arm 112 may be either integral to actuator arm 112 or may be manufactured as a separate piece that is attached. In the embodiments wherein the leading surface 142 is integral to actuator arm 112, the arm may be formed by extrusion or machining of the actuator arm 112. In either case, the actuator arm 112 itself may be made of any suitable material that suits the needs of a disc drive.

In another embodiment of the present invention, the leading surface is formed 142 by injection molding out of a suitable material, such as plastic, for attachment to the actuator arm 112. Attachment of the arm could be accomplished, for example, by a snap attachment, adhesive, welding, or any other suitable method.

Figure 5:
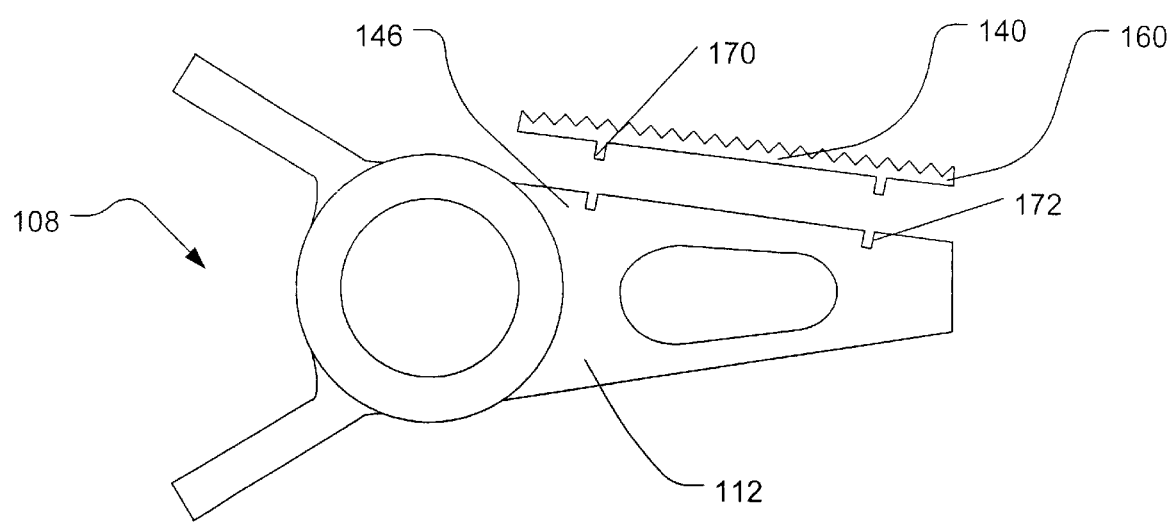
FIG. 5 is a perspective view of an actuator assembly with the heads and flexures removed constructed in accordance with those embodiments who utilize an injection molded leading surface portion which is attached via snap fit or by adhesives.

As shown in FIG. 5, in the embodiments where a snap or adhesive attachment is utilized, two or more locating pins 170 may be utilized in order to line up the injection molded strip 160 with the actuator arm 112. The actuator arm 112 would have matching receptacles 172 located on the leading surface 146 to receive the locating pins 170. The receptacles 172 may be machined to either facilitate the use of an adhesive or to create a snug snap fit.

Alternatively stated, a first contemplated embodiment of the present invention takes the form of a disc drive assembly (such as 100) having a basedeck (such as 102) and top cover. A spindle motor (such as 104) is mounted to the basedeck (such as 102) where with at least one magnetic storage disc (such as 106) is mounted to the spindle motor (such as 104) which rotates around a central axis. The disc drive assembly (such as 100) also includes an actuator arm assembly (such as 108) that includes an actuator arm (such as 112) rotatably attached to a bearing shaft assembly (such as 110) with a suspension arm (such as 114) attached to a distal end of the actuator arm (such as 112). A magnetic transducing head (such as 116) is attached to the suspension (such as 114) and is used to read and write data to the magnetic storage disc (such as 106). In addition a leading surface portion (such as 142, 144) of the actuator arm (such as 112) includes several turbulence-reducing portions laterally recessed so as to guide a airflow to reduce a flow-induced disturbance acting on the transducing head (such as 116). Optionally, the leading surface portion (such as 142, 144) may be comprised of rounded notches (such as 140). Alternatively, the leading surface portion (such as 142, 144) may be comprised of saw tooth triangular notches (such as 150). The leading surface portion (such as 142, 144) integral to the actuator arm (such as 112) may be machined into the actuator arm. As an alternative, the leading surface portion (such as 142, 144) may be integrated with the extruded actuator arm (such as 112). In yet another alternative embodiment of the invention, the leading surface portion (such as 142, 144) may be an injection molded polymer that is then snap attached to the actuator arm (such as 112). Alternatively stated, a second contemplated embodiment of the present invention takes the form of an actuator assembly (such as 108) in a disc drive assembly (such as 100) with at least one rotatable disc (such as 106). The actuator assembly (such as 108) includes an actuator arm (such as 112) rotatably attached to a bearing shaft assembly (such as 110) with a suspension arm (such as 114) attached to a distal end of the actuator arm (such as 112). A magnetic transducing head (such as 116) is attached to the suspension (such as 114) and is used to read and write data to the magnetic storage disc (such as 106). In addition a leading surface portion (such as 142, 144) of the actuator arm (such as 112) includes several turbulence-reducing portions laterally recessed so as to guide a airflow to reduce a flow-induced disturbance acting on the transducing head (such as 116). The leading surface portion (such as 142, 144) may include rounded notches (such as 140). Alternatively, the leading surface portion (such as 142, 144) may include saw tooth triangular notches (such as 150). As a further option, the leading surface portion (such as 142, 144) integral to the actuator arm (such as 112) may be machined into the actuator arm. In an alternative, the leading surface portion (such as 142, 144) may be integrated with the actuator arm (such as 112) the extruded actuator arm (such as 112). In yet another alternative embodiment of the invention, the leading surface portion (such as 142, 144) may be an injection molded polymer that is then snap attached to the actuator arm (such as 112).

It is to be understood that even though numerous characteristics and advantages of various embodiments of the present invention have been set forth in the foregoing description, together with details of the structure and various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular application for the contoured leading surface portions 142, 144 while maintaining substantially the same functionality without departing from the scope and spirit of the present invention. In addition, although the preferred embodiment described herein is directed to a turbulence reducing actuator arm in a disc drive, it will be appreciated by those skilled in the art that the teachings of the present invention can be applied to other systems, without departing from the spirit or scope of the present invention.

What is claimed is:

1. An actuator assembly in a disc drive having at least one rotatable disc, the actuator assembly comprising:
    an actuator arm rotatably attached to a pivot axis;
    a suspension arm attached to a distal end of the actuator arm;
    a magnetic transducing head attached to a distal end of the suspension used to read and write information to the rotatable disc; and
    a leading surface portion of the actuator arm with several turbulence-reducing portions laterally recessed so as to guide an airflow to reduce flow-induced disturbance action on the transducing head.

2. The actuator assembly of claim 1 in which the leading surface portion is comprised of rounded notches.

3. The actuator assembly of claim 2, in which the leading surface portion is machined into the actuator arm.

4. The actuator assembly of claim 2, in which the leading surface portion is integrated with the actuator arm and the actuator arm is extruded.

5. The actuator assembly of claim 1, in which the leading surface portion is comprised of saw tooth triangular notches.

6. The actuator assembly of claim 5, in which the leading surface portion is machined into the actuator arm.

7. The actuator assembly of claim 5, in which the leading surface portion is integrated to the actuator arm and the actuator arm is extruded.

8. The actuator assembly of claim 1, in which the leading surface portion is an injection molded polymer that is then snap attached to the actuator arm.

9. A disc drive assembly, comprising:
    a basedeck and top cover;
    a spindle motor mounted to the basedeck which rotates around a central axis;
    at least one magnetic storage disc mounted to the spindle motor for rotation around the central axis;
    an actuator arm assembly comprising:
        an actuator arm rotatably attached to a pivot axis;
        a suspension arm attached to a distal end of the actuator arm;
        a magnetic transducing head attached to the suspension, used to read and write information to the magnetic storage disc; and
        a leading surface portion of the actuator arm with several turbulence-reducing portions laterally recessed so as to guide an airflow to reduce a flow-induced disturbance acting on the transducing head.

10. The disc drive assembly of claim 9 in which the leading surface portion is comprised of rounded notches.

11. The disc drive assembly of claim 10, in which the leading surface portion is machined into the actuator arm.

12. The disc drive assembly of claim 10, in which the leading surface portion is integrated with the actuator arm and the actuator arm is extruded.

13. The disc drive assembly of claim 9, in which the leading surface portion is comprised of sawtooth triangular notches.

14. The disc drive assembly of claim 13, in which the leading surface portion is machined into the actuator arm.

15. The disc drive assembly of claim 13, in which the leading surface portion is integrated with the actuator arm and the actuator arm is extruded.

16. The disc drive assembly of claim 9, in which the leading surface portion is a injection molded polymer that is then attached to the actuator arm.

17. A disc drive assembly having a disc mounted for rotation on a spindle motor, the disc having a surface portion for recording and reading data, the disc drive assembly further comprising:

an actuator assembly extending within a flow of air created by the rotating disc, the actuator assembly including an actuator arm and a suspension for positioning a transducing head above the disc surface portion; and means for reducing flow induced disturbance action on the head.

18. The disc drive assembly of claim 17, in which the means for reducing the flow induced disturbance action on the transducing head comprises several triangular cutouts on a leading surface portion of the actuator arm.

19. The disc drive assembly of claim 17, in which the means for reducing the flow induced disturbance action on the transducing head comprises several rounded notches on a leading surface portion of the actuator arm.

* * * * *